(12) United States Patent
Gregg et al.

(10) Patent No.: US 8,511,034 B2
(45) Date of Patent: *Aug. 20, 2013

(54) HYBRID CONTOURED LOAD-SPREADING WASHER

(75) Inventors: Paul S. Gregg, Seattle, WA (US); Jack Esposito, Auburn, WA (US); Lee C. Firth, Renton, WA (US); Kenneth J. Hunziker, Renton, WA (US)

(73) Assignee: The Boeing Company, Chicago, IL (US)

( * ) Notice: Subject to any disclaimer, the term of this patent is extended or adjusted under 35 U.S.C. 154(b) by 387 days.

This patent is subject to a terminal disclaimer.

(21) Appl. No.: 12/117,185

(22) Filed: May 8, 2008

(65) Prior Publication Data
US 2009/0003965 A1  Jan. 1, 2009

Related U.S. Application Data

(63) Continuation-in-part of application No. 11/749,895, filed on May 17, 2007.

(51) Int. Cl.
*E04B 1/38* (2006.01)

(52) U.S. Cl.
USPC .......................................... 52/698; 248/429

(58) Field of Classification Search
USPC ...... 52/698; 248/429; 244/118.6; 296/65.13
See application file for complete search history.

(56) References Cited

U.S. PATENT DOCUMENTS

| | | | |
|---|---|---|---|
| 271,365 A | | 1/1883 | Rodney |
| 3,184,769 A | * | 5/1965 | Barwood .......................... 470/4 |
| 3,415,064 A | * | 12/1968 | Talobre ...................... 405/302.1 |
| 3,873,168 A | | 3/1975 | Viola et al. |
| 4,110,056 A | | 8/1978 | Stevenson |
| 4,399,642 A | * | 8/1983 | Bard et al. ................... 52/483.1 |
| 4,444,587 A | * | 4/1984 | Kelly ............................... 420/44 |
| 4,512,699 A | * | 4/1985 | Jackson et al. ................ 411/368 |
| 4,530,147 A | * | 7/1985 | Mattei et al. .................... 29/525 |
| 4,749,610 A | * | 6/1988 | Katsuragawa et al. ........ 442/261 |
| 4,778,702 A | * | 10/1988 | Hutter, III .................... 428/40.9 |
| 4,842,912 A | * | 6/1989 | Hutter, III .................... 428/66.6 |
| 5,431,518 A | | 7/1995 | Young et al. |

(Continued)

FOREIGN PATENT DOCUMENTS

| | | |
|---|---|---|
| EP | 0619441 | 10/1994 |
| WO | 2006/102090 | 9/2006 |
| WO | 2007/090188 | 8/2007 |
| WO | PCT/US2008/063547 | 5/2008 |

OTHER PUBLICATIONS

United States Patent and Trademark Office, "Non-Final Office Action," issued in connection with U.S. Appl. No. 11/749,895, mailed Dec. 13, 2011, 11 pages.

(Continued)

*Primary Examiner* — Mark Wendell
(74) *Attorney, Agent, or Firm* — Hanley, Flight & Zimmerman, LLC

(57) ABSTRACT

A hybrid contoured load-spreading washer is disclosed. An illustrative embodiment of the washer includes a washer body having a composite layer and a metal layer bonded to the composite layer and a fastener opening extending through the washer body. A floor beam seat track attachment assembly and a method of transmitting a load from a seat track to a floor beam web in a seat track attachment assembly are also disclosed.

19 Claims, 3 Drawing Sheets

(56) References Cited

U.S. PATENT DOCUMENTS

| | | | |
|---|---|---|---|
| 5,444,603 A | 8/1995 | Otsuka et al. | |
| 5,500,272 A | 3/1996 | Padden | |
| 5,888,012 A | 3/1999 | Nygren, Jr. et al. | |
| 6,129,326 A | 10/2000 | Mandon | |
| 6,287,664 B1 * | 9/2001 | Pratt | 428/68 |
| 6,467,521 B1 * | 10/2002 | Pratt | 156/351 |
| 7,160,630 B2 * | 1/2007 | Klos | 428/658 |
| 7,207,523 B2 * | 4/2007 | Callahan et al. | 244/118.6 |
| 2002/0187020 A1 | 12/2002 | Julien | |
| 2003/0116395 A1 * | 6/2003 | Kettler et al. | 192/43.2 |
| 2005/0117998 A1 | 6/2005 | Patell | |
| 2006/0062650 A1 * | 3/2006 | Keener | 411/34 |
| 2006/0214058 A1 * | 9/2006 | Westre et al. | 244/119 |
| 2008/0286073 A1 | 11/2008 | Gregg et al. | |

OTHER PUBLICATIONS

United States Patent and Trademark Office, "Advisory Action," issued in connection with U.S. Appl. No. 11/749,895, mailed Dec. 1, 2011, 2 pages.

United States Patent and Trademark Office, "Final Office Action," issued in connection with U.S. Appl. No. 11/749,895, mailed Jul. 18, 2011, 12 pages.

United States Patent and Trademark Office, "Non-Final Office Action," issued in connection with U.S. Appl. No. 11/749,895, mailed Feb. 1, 2011, 11 pages.

United States Patent and Trademark Office, "Non-Final Office Action," issued in connection with U.S. Appl. No. 11/749,895, mailed Sep. 28, 2010, 8 pages.

United States Patent and Trademark Office, "Advisory Action," issued in connection with U.S. Appl. No. 11/749,895, mailed Aug. 16, 2010, 3 pages.

United States Patent and Trademark Office, "Final Office Action," issued in connection with U.S. Appl. No. 11/749,895, mailed Apr. 30, 2010, 9 pages.

United States Patent and Trademark Office, "Non-Final Office Action," issued in connection with U.S. Appl. No. 11/749,895, mailed Nov. 9, 2009, 13 pages.

Patent Cooperation Treaty, "International Search Report," issued by the International Searching Authority in connection with PCT application No. PCT/US2008/063547, mailed Mar. 5, 2009 (3 pages).

Patent Cooperation Treaty, "Written Opinion of the International Searching Authority," issued by the International Searching Authority in connection with PCT/US2008/063547, mailed Mar. 5, 2009 (5 pages).

Patent Cooperation Treaty, "International Preliminary Report on Patentability," issued by the International Searching Authority in connection with PCT/US2008/063547, mailed Nov. 17, 2009 (6 pages).

United States Patent and Trademark Office, "Final Office Action," issued in connection with U.S. Appl. No. 11/749,895, mailed May 18, 2012 (16 pages).

United States Patent and Trademark Office, "Advisory Action," issued in connection with U.S. Appl. No. 11/749,895, mailed Jul. 26, 2012 (4 pages).

* cited by examiner

HYBRID CONTOURED LOAD-SPREADING WASHER

CROSS REFERENCE TO RELATED APPLICATION

This application is a continuation-in-part of U.S. patent application Ser. No. 11/749,895 filed May 17, 2007, the entire contents of which are incorporated by reference herein.

FIELD

The present invention relates to bolted joints. More particularly, the present invention relates to a hybrid contoured load-spreading washer which is suitable for optimally distributing loads in a bolted joint such as a seat track assembly, for example.

BACKGROUND

In many structural applications, particularly aerospace applications, local load paths at attachments often require efficient local strengthening and stiffening. One widely-acceptable method for accomplishing this objective includes the use of "radius-filling" shaped washers to attach structural members to each other. The general function of these washers is to divert and reduce concentrated loads in a circuitous load path without adding excessive weight or cost. The key material properties desired in structural members include high shear stiffness, high shear strength and low density such that the members can be as thick as possible, enhancing load-carrying capability. For example, the seat track attachments in the floor structure of aircraft must be designed to withstand various types of loads. One such load case is the 9G forward crash case. This particular load case causes a severe vertical load in the seat tracks due to the overturning effect of the seat structure when occupied by passengers. The high vertical load must be reacted through the seat track-to-floor beam connection.

A typical manner of rendering the seat track-to-floor beam connection sufficiently strong for the 9G forward crash case includes locally increasing thicknesses of the seat track flanges, the floor beam web, or both where these components are bolted together. While this is feasible using machined parts or built-up assemblies, it is more difficult or expensive to accomplish using automated laser-welded structure with secondarily bonded composite caps.

The geometric features of the seat track-to-floor beam connection require unique solutions for the attachment. Composite floor beams having flat or planar webs conventionally use "radius-filling" washers to help spread the load from the bolted connection into the web. The washers are typically metal and nest closely to the cap-to-web intersection. In the case of "sine-wave" floor beam webs, however, conventional "radius-filling" washers are not able to nest into the web-to-cap intersection.

Conventional "radius-filling" washers are aluminum, which has good specific shear strength to density ratio. Due to corrosion issues, however, aluminum parts are not allowed on many advanced composite structures. One disadvantage which is inherent in conventional radius-filling washers is that the washers are incapable of nesting with the "sine-wave" floor beam web configuration. Furthermore, because they are monolithic metal pieces, the washers are not structurally efficient to an optimum degree in the transmission of bolt loads to a floor beam web in a seat track attachment assembly.

SUMMARY

The present invention is generally directed to a hybrid contoured load-spreading washer. An illustrative embodiment of the washer includes a washer body having a composite layer and a metal layer bonded to the composite layer and a fastener opening extending through the washer body. The present invention is further generally directed to a seat track attachment assembly and a method of transmitting a load from a seat track to a floor beam web in a seat track attachment assembly.

BRIEF DESCRIPTION OF THE DRAWINGS

The invention will now be described, by way of example, with reference to the accompanying drawings, in which.

DETAILED DESCRIPTION

Figure 1:
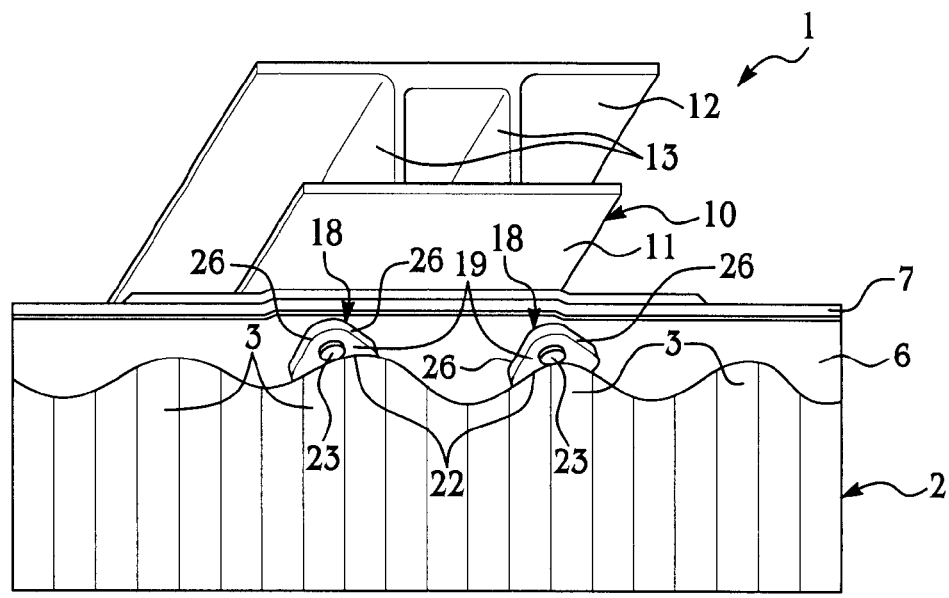
FIG. 1 is a perspective view of a seat track attachment assembly in typical implementation of an illustrative embodiment of the hybrid contoured load-spreading washer.

As shown in FIG. 1, the seat track attachment assembly 1 includes the floor beam web 2, which is typically titanium and has an undulating "sine-wave" configuration, including multiple web ridges 3, for strength and rigidity. A planar metal floor beam cap 6, which is typically titanium, is provided on the floor beam web 2. A composite floor beam cap 7, which may be graphite, for example, is typically provided on the metal floor beam cap 6. The seat track 10 includes a bottom track flange 11 which rests on the composite floor beam cap 7. A pair of spaced-apart connecting flanges 13 extends from the bottom track flange 11. A top track flange 12 is provided on the connecting flanges 13. Passenger seats (not shown) are fastened to the top track flange 12 using techniques which are known to those skilled in the art.

Figure 2:
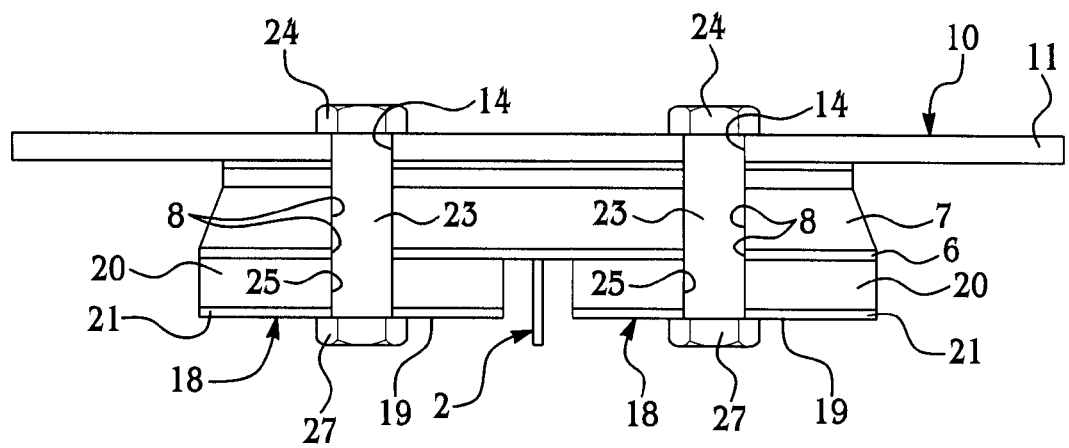
FIG. 2 is a cross-sectional view of the seat track attachment assembly and hybrid contoured load-spreading washers.

In typical application, a pair of the washers 18 is provided on a pair of fasteners 23, respectively, which secures the seat track 10 to the floor beam web 2. As shown in FIG. 2, a pair of spaced-apart fastener openings 14 extends through the bottom track flange 11 of the seat track 10. Fastener openings 8 also extend through the metal floor beam cap 6 and the composite floor beam cap 7 in registering relationship with respect to the fastener openings 14 in the bottom track flange 11. As further shown in FIG. 2, each fastener 23 has a fastener head 24 which typically engages the bottom track flange 11. Each fastener 23 is adapted to extend through each fastener opening 14 and corresponding pair of fastener openings 8, respectively, and receives a securing nut 27 which typically engages the corresponding washer 18 in assembly of the seat track attachment assembly 1.

As shown in FIG. 1, each washer 18 includes a washer body 19 having a generally triangular shape. The washer body 19 includes a pair of washer sides 26 which are disposed in angular relationship with respect to each other. A concave washer gap 22 forms a third side of the washer body 19 and extends between the washer sides 26. Accordingly, as will be hereinafter described, the washer gap 22 of each washer body 19 substantially conforms to the contour of a web ridge 3 in the floor beam web 2.

As shown in FIG. 2, the washer body 19 of each washer 18 includes a highly-biased composite layer 20 and a metal layer 21 which is bonded to the composite layer 20. In some embodiments, the composite layer 20 is graphite/epoxy. In some embodiments, the metal layer 21 is 6Al-4V titanium. The composite layer 20 is highly biased along an axis of high bias composite 30 (FIG. 3) which is generally parallel to the plane of the washer body 19.

A typical method of fabrication of the washer body 19 includes laminating the composite layer 20 to a metal (typically 6Al-4V titanium) sheet (not shown) which is a precursor to the metal layer 21, followed by cutting of the washer sides 26 and washer gap 22 to form the generally triangular shape of the washer body 19. The washer body 19 is thus a single washer body made from only one washer. A fastener opening 25 extends through the composite layer 20 and the metal layer 21, at substantially the center of the washer body 19. The washer body 19 and the fastener opening 25 may be formed using waterjet cutting techniques or alternative cutting techniques which are known to those skilled in the art.

The fastener opening 25 is adapted to receive the corresponding fastener 23 as the fastener 23 is extended through the corresponding fastener opening 14 provided in the bottom track flange 11 of the seat track 10 and the registering fastener openings 8 provided in the composite floor beam cap 7 and the metal floor beam cap 6, respectively. The nut 27 is threaded on the fastener 23 and typically tightened against the metal layer 21 of the washer body 19 to secure the washer 18 against the metal floor beam cap 6. As shown in FIG. 1, the washer notch 22 provided in the washer body 19 of each washer 18 receives and engages a complementary-shaped web ridge 3 of the floor beam web 2.

Figure 3:
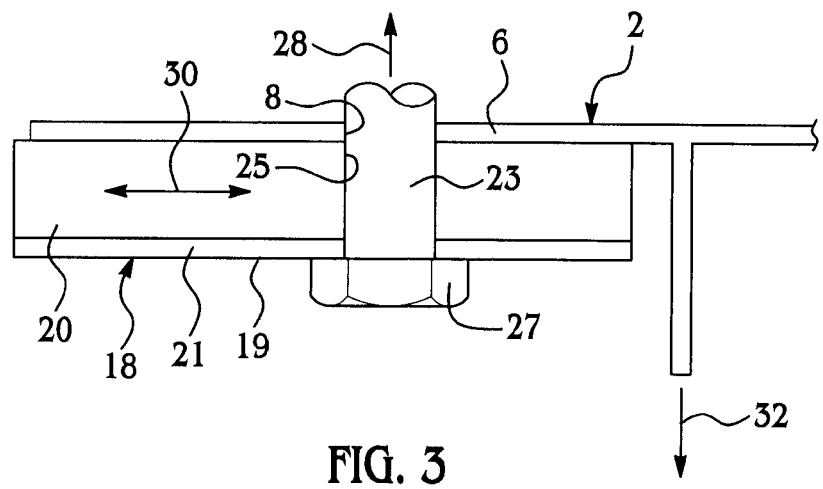
FIG. 3 is a cross-sectional view of a hybrid contoured load-spreading washer, fastened to a floor beam web of the seat track attachment assembly and more particularly illustrating direction of a high bias component load and a web tension load in the washer upon application of loads to the assembly.

In typical application, the seat track assembly 1 is designed to support multiple aircraft passenger seats (not shown) which are attached to the top track flange 12 of the seat track 10 using fastening techniques which are known to those skilled in the art. Under crash conditions the seat track 10 applies tensile loads, particularly crash loads, to each fastener 23. Each washer 18 transmits the crash loads from the corresponding fastener 23 to the floor beam web 2. As shown in FIG. 3, the crash loads typically include a primary fastener load 28 which is applied by each fastener 23 and nut 27 to the corresponding washer 18. The composite layer 20 of each washer 18 spreads or distributes a substantial portion of this primary fastener load 28 along the axis of high bias composite 30 of the composite layer 20. The resulting tensional load 32 is applied to the floor beam web 2. The highly-biased property of the composite layer 20 along the axis of high bias composite 30 facilitates "beaming" or distribution of a substantial proportion of the primary fastener load 28 closely to the floor beam web 2. Consequently, the primary fastener load 28 is spread out or distributed over a larger portion of the floor beam web 2 than is the case with respect to conventional, monolithic radius-filling washers. This facilitates efficient transmission of the crash loads from the seat track 10 to the floor beam web 2 without the need to increase the gage or thickness of the floor beam web 2. The typically titanium metal layer 21 on the washer body 19 of each washer 18 acts as a compressive caul plate by absorbing the bearing load from each corresponding nut 27.

Figure 4:
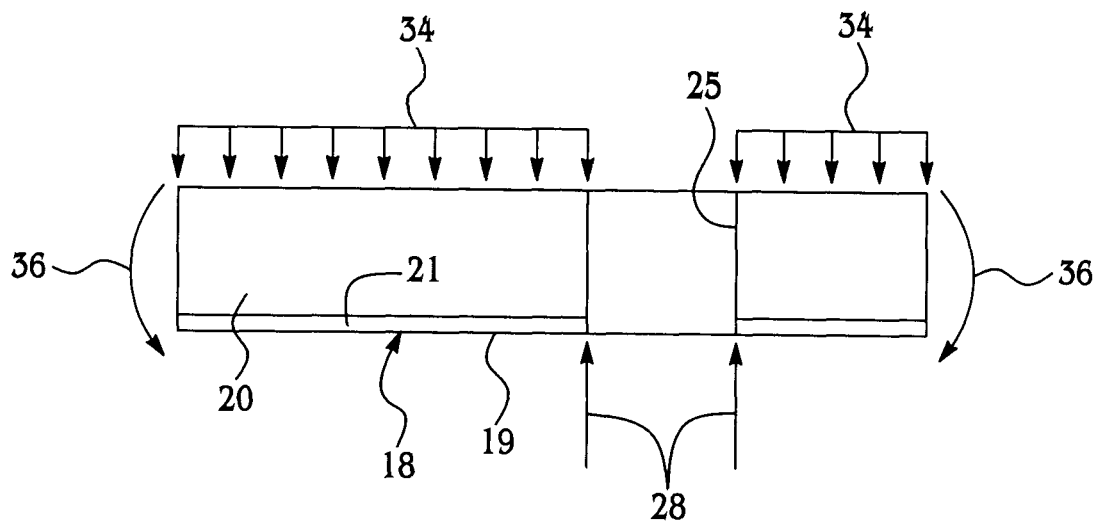
FIG. 4 is a cross-sectional view of a hybrid contoured load-spreading washer, more particularly illustrating a primary bolt load, a distributed reaction load and induced loading movements upon application of a load to the washer.
Figure 5:
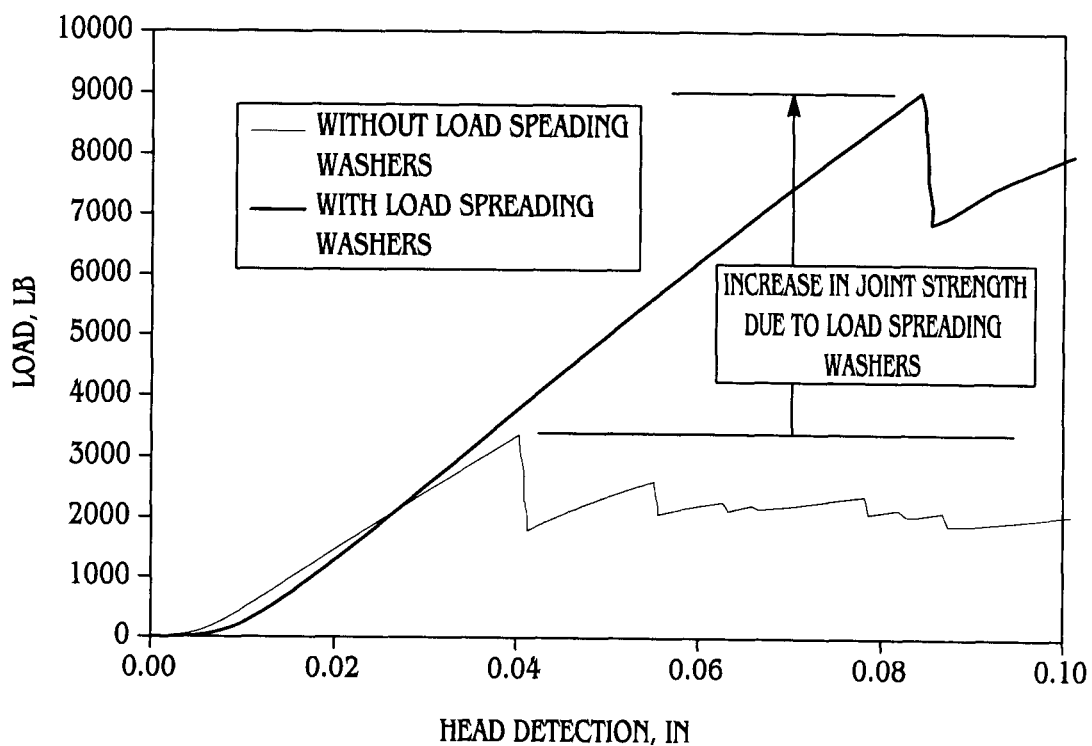
FIG. 5 is a graph which illustrates load-bearing performance of a hybrid contoured load-bearing washer.

FIG. 4 illustrates a distributed reaction load 34 and induced bending movement 36 in relation to the primary fastener load 28 applied to the washer body 19 of each washer 18 during crash loading. The graph of FIG. 5 illustrates load-bearing performance of a hybrid contoured load-bearing washer 1 with head deflection (in inches) of each fastener expressed as a function of the load (in lbs.) applied to each fastener.

Although this invention has been described with respect to certain exemplary embodiments, it is to be understood that the specific embodiments are for purposes of illustration and not limitation, as other variations will occur to those of ordinary skill in the art.

Figure 6:
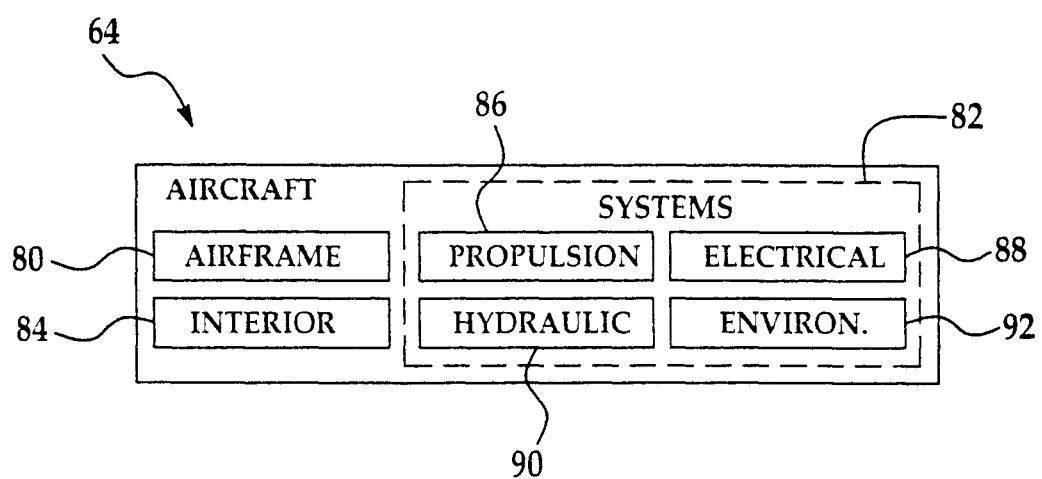
FIG. 6 is a block diagram of an aircraft.

Embodiments of the disclosure may find use in a variety of potential applications, particularly in the transportation industry, including for example, aerospace, marine and automotive applications. Thus, referring now to FIG. 6, embodiments of the disclosure may be used in the context of an aircraft 64 as shown in FIG. 6. As shown in FIG. 6, the aircraft 64 may include an airframe 80 with a plurality of systems 82 and an interior 84. Examples of high-level systems 82 include one or more of a propulsion system 86, an electrical system 88, a hydraulic system 90, and an environmental system 92. Any number of other systems may be included. Although an aerospace example is shown, the principles of the disclosure may be applied to other industries, such as the marine and automotive industries.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An apparatus, comprising:
   a body comprising a fiber reinforced composite layer and a metal layer, said metal layer laminated to said fiber reinforced composite layer; and
   an opening extending through said body to receive a fastener, a surface of the body is to correspond to and matingly engage a contour of an adjacent structure to enable a portion of a tensile load applied to the fastener to be distributed axially through the body to the structure, the surface non-perpendicular to an axis of the opening.

2. The apparatus of claim 1 wherein said fiber reinforced composite layer comprises graphite and epoxy.

3. The apparatus of claim 1 wherein said metal layer comprises a titanium alloy.

4. The apparatus of claim 1 wherein said fiber reinforced composite layer is biased along an axis disposed in generally parallel relationship with respect to a plane of said body.

5. The apparatus of claim 1 further comprising a gap provided in said body to receive the contour of the adjacent structure.

6. The apparatus of claim 1 wherein the tensile load comprises a crash load.

7. An apparatus, comprising:
   at least one body having a composite layer and a metal layer, said metal layer bonded to said composite layer, and a fastener opening extending through said composite layer and said metal layer, a surface non-perpendicular to said fastener opening comprises a contour to matingly engage an adjacent structure; and
   a fastener is to extend through said fastener opening of said body and said composite layer of said body is to engage a floor beam cap, said fastener is to extend through a fastener opening of a seat track and the fastener opening of a floor beam cap, an interaction between the surface and the adjacent structure to enable a portion of a tensile load applied to the fastener to be distributed axially through the body to the structure.

8. The apparatus of claim 7 further comprising a plurality of bodies and a plurality of fasteners.

9. The apparatus of claim 7 wherein said composite layer of said body comprises graphite and epoxy.

10. The apparatus of claim 7 wherein said metal layer of said body comprises a titanium alloy.

11. The apparatus of claim 7 wherein said composite layer of said body is biased along an axis disposed in generally parallel relationship with respect to a plane of said body.

12. The apparatus of claim 7 wherein said body has a generally triangular shape defined by three sides where one of said three sides comprises a concave notch shape.

13. A method of transmitting a load from a seat track to a floor beam web in a seat track attachment assembly having a floor beam cap between said seat track and said floor beam web, comprising:
   providing at least one washer including a washer body having a composite layer and a metal layer, said washer body in engagement with a floor beam web, a metal layer bonded to said composite layer, and a fastener opening extending through said washer body;
   extending a fastener through said at least one fastener opening in said seat track, said at least one fastener opening in said floor beam cap and said fastener opening in said washer body; and
   transmitting a primary fastener load from said seat track to said floor beam web through said fastener and said washer body, respectively.

14. The method of claim 13 wherein said composite layer of said washer body comprises graphite and epoxy and said metal layer of said washer body comprises a titanium alloy.

15. The method of claim 13 wherein said composite layer of said washer body is biased along an axis disposed in generally parallel relationship with respect to a plane of said washer body.

16. The method of claim 13 further comprising a plurality of web ridges provided in said floor beam web and a washer notch provided in said washer body and receiving one of said plurality of web ridges.

17. An apparatus, comprising:
   a body comprising a fiber reinforced composite layer and a metal layer, said metal layer bonded to said fiber reinforced composite layer, said metal layer comprising an outermost major area surface of said body; and
   an opening extending through said body to receive a fastener, said body comprises three sides, one of said three sides comprises a shape that is to correspond to a contour of an adjacent structure to enable a substantial portion of a load applied to the fastener to be distributed through the body to the structure, the one of said three sides non-perpendicular to an axis of the opening.

18. The apparatus of claim 17 further comprising a pair of sides disposed in angular relationship with respect to each other.

19. The apparatus of claim 18 further comprising a gap provided in said body and extending between said pair of sides.

* * * * *